US012565946B2

(12) United States Patent　　　(10) Patent No.:　US 12,565,946 B2
Shimizu　　　　　　　　　　　　　(45) Date of Patent:　　　Mar. 3, 2026

(54) PIPE SUPPORT MEMBER

(71) Applicant: Inaba Denki Sangyo Co., Ltd., Osaka (JP)

(72) Inventor: Akira Shimizu, Osaka (JP)

(73) Assignee: Inaba Denki Sangyo Co., Ltd., Osaka (JP)

( * ) Notice: Subject to any disclaimer, the term of this patent is extended or adjusted under 35 U.S.C. 154(b) by 0 days.

(21) Appl. No.: 18/711,235

(22) PCT Filed: Jun. 10, 2022

(86) PCT No.: PCT/JP2022/023440
　§ 371 (c)(1),
　(2) Date: May 17, 2024

(87) PCT Pub. No.: WO2023/089854
　PCT Pub. Date: May 25, 2023

(65) Prior Publication Data
　US 2025/0003529 A1　　Jan. 2, 2025

(30) Foreign Application Priority Data

Nov. 19, 2021　(JP) ................................. 2021-188611

(51) Int. Cl.
　*F16L 3/12*　　　(2006.01)
　*F16L 3/00*　　　(2006.01)
　*F16L 3/127*　　(2006.01)
(52) U.S. Cl.
　CPC ................. *F16L 3/127* (2013.01); *F16L 3/00* (2013.01)

(58) Field of Classification Search
　CPC ........ F16B 37/04; F16B 37/045; F16B 41/00; F16L 3/08; F16L 3/01; F16L 3/04
　See application file for complete search history.

(56) References Cited

U.S. PATENT DOCUMENTS

| | | | | |
|---|---|---|---|---|
| 624,484 | A | * | 5/1899 | Haskell ..................... F16L 3/12 |
| | | | | 248/74.1 |
| 2,193,758 | A | * | 3/1940 | Bentley ................... F16L 3/127 |
| | | | | 248/74.1 |
| 2,252,072 | A | * | 8/1941 | Gerhardt ............... D06F 39/083 |
| | | | | D32/12 |
| 2,338,658 | A | * | 1/1944 | Morehouse ........... F16L 3/1233 |
| | | | | 174/40 CC |
| 2,341,829 | A | * | 2/1944 | Tinnerman ............ F16B 37/041 |
| | | | | 411/84 |

(Continued)

FOREIGN PATENT DOCUMENTS

| | | |
|---|---|---|
| JP | 2002147426 A | 5/2002 |
| JP | 2003148435 A | 5/2003 |

(Continued)

*Primary Examiner* — Nkeisha Smith
(74) *Attorney, Agent, or Firm* — The Webb Law Firm

(57) ABSTRACT

A pipe support member (1) includes a restraint member (10) configured to be fixed to a base metal fitting (70) by fastening a first bolt (B1) and a first nut (N1) screwed thereto in a state of surrounding an outer peripheral surface of a pipe to hold the pipe; and a nut holding member (50) configured to be attachably and detachably attached to the restraint member (10) directly or indirectly such that the first nut (N1) is disposed at an attached position in a state of holding the first nut (N1).

9 Claims, 11 Drawing Sheets

(56) References Cited

U.S. PATENT DOCUMENTS

| | | | | | |
|---|---|---|---|---|---|
| 2,352,823 | A | * | 7/1944 | Herman | F16L 3/1233 174/40 CC |
| 2,407,609 | A | * | 9/1946 | Judd | F16B 37/04 411/176 |
| 2,421,443 | A | * | 6/1947 | Torresen | F16L 3/1233 174/40 CC |
| 2,464,620 | A | * | 3/1949 | Tinnerman | F16B 5/0258 24/135 R |
| 2,826,385 | A | * | 3/1958 | Osborn | F16L 3/12 248/300 |
| 2,998,217 | A | * | 8/1961 | Englis | F16L 3/1008 248/222.52 |
| 3,068,924 | A | | 12/1962 | Summers | |
| 3,099,054 | A | * | 7/1963 | Spiro | F16L 3/1236 248/74.3 |
| 3,258,822 | A | * | 7/1966 | Schlesch | F16L 41/06 24/284 |
| 3,815,855 | A | * | 6/1974 | Appleton | F16L 3/1233 174/40 CC |
| 4,029,276 | A | * | 6/1977 | Zielie | F16L 3/1033 248/74.1 |
| 4,113,286 | A | * | 9/1978 | Kennedy, Jr. | F16L 3/127 248/62 |
| 4,153,228 | A | * | 5/1979 | Delserro | F16L 3/123 24/19 |
| 5,056,196 | A | * | 10/1991 | van Walraven | E04D 13/08 24/279 |
| 5,170,973 | A | * | 12/1992 | Ohta | B60G 13/006 248/230.2 |
| 5,738,326 | A | * | 4/1998 | Liao | A47C 9/08 248/188.4 |
| 5,893,538 | A | * | 4/1999 | Onishi | F16L 3/2431 248/65 |
| 5,927,810 | A | * | 7/1999 | Liao | A47C 9/08 248/405 |
| 6,557,878 | B2 | * | 5/2003 | Chen | B62K 19/36 280/226.1 |
| 6,672,545 | B1 | * | 1/2004 | Persing | F16L 3/1211 248/58 |
| 8,714,496 | B2 | * | 5/2014 | Blanchard | H02G 3/32 248/65 |
| 8,978,212 | B2 | * | 3/2015 | Krueger | F16L 33/04 24/280 |
| 9,518,684 | B2 | * | 12/2016 | Juzak | F16L 3/1083 |
| 9,625,059 | B2 | * | 4/2017 | Meister | F16L 3/1211 |
| 10,260,659 | B2 | * | 4/2019 | Robinault | F16L 3/123 |
| 11,006,588 | B1 | * | 5/2021 | Jordan | F16L 3/127 |
| 11,371,177 | B2 | * | 6/2022 | Kim | D06F 39/083 |
| 2002/0066833 | A1 | * | 6/2002 | Ferrill | F16L 3/04 248/62 |
| 2014/0061412 | A1 | * | 3/2014 | Suzuki | F16B 37/02 248/226.11 |
| 2015/0252941 | A1 | * | 9/2015 | Sirkin | E04H 17/1417 248/219.4 |
| 2021/0080032 | A1 | | 3/2021 | Belen et al. | |
| 2021/0190238 | A1 | * | 6/2021 | Ortega Gomez | F16L 3/1215 |

FOREIGN PATENT DOCUMENTS

| | | |
|---|---|---|
| JP | 2004232798 A | 8/2004 |
| JP | 20053014 A | 1/2005 |
| JP | 2016169840 A | 9/2016 |
| JP | 201757969 A | 3/2017 |
| JP | 201825290 A | 2/2018 |

* cited by examiner

PIPE SUPPORT MEMBER

CROSS-REFERENCE TO RELATED APPLICATIONS

This application is the United States national phase of International Patent Application No. PCT/JP2022/023440 filed Jun. 10, 2022, and claims priority to Japanese Patent Application No. 2021-188611 filed Nov. 19, 2021, the disclosures of which are hereby incorporated by reference in their entireties.

BACKGROUND OF THE INVENTION

Field of the Invention

The present invention relates to a pipe support member.

Description of Related Art

In an air conditioner installed in a structure such as a building, for example, a refrigerant pipe may be disposed over from an outdoor unit installed outdoors to an indoor unit installed indoors. In this case, for example, in a case of heating operation, there is a possibility that the refrigerant pipe extends in an axial direction due to thermal expansion, and a load corresponding to an extension amount is applied to a bending portion (so-called elbow portion) on an end portion side of the refrigerant pipe. In particular, in a case in which the refrigerant pipe is disposed in an up-down direction, a load due to a weight of the refrigerant pipe may be added, and thus there is a possibility that a large load is applied to the above-described bending portion. In order to address such a concern, a part of the refrigerant pipe in the axial direction is fixed by using a pipe support member that is connected to a base metal fitting fixed to a structure, and the movement of the refrigerant pipe in the axial direction at the fixing location is prevented. By dispersing the extension amount of the pipe member due to thermal expansion on both sides in the axial direction with the fixing location as a center, a load on the bending portion on the lower end side is reduced.

An example of the pipe support member is disclosed in Japanese Patent Application Laid-Open No. 2018-25290. The pipe support member includes a pair of clamp members 71 having slit-shaped engaging holes 73, and a pipe member P is supported by locking a flange portion 31 of a mounting member 1 fixed to an outer peripheral surface of the pipe member P with the engaging hole 73. The fixing of the mounting member 1 to the pipe member P is performed by welding means such as brazing.

However, welding construction such as brazing requires a certain level of skill, and there is a possibility that the quality of the construction may vary depending on the skill of an operator. In addition, it is common that a plurality of pipe members P is disposed in the structure, and the number of the fixing locations of the mounting member 1 on the pipe member P is large in the entire structure as a construction target. In a case in which all of them are performed by welding means, there is a problem that a large amount of labor is required and the work efficiency is poor.

SUMMARY OF THE INVENTION

There is a demand for realizing a pipe support member having excellent work efficiency.

A pipe support member according to an aspect of the present invention is a pipe support member that is connected to a base metal fitting fixed to a structure to support a pipe, and includes a restraint member configured to be fixed to the base metal fitting by fastening a first bolt and a first nut screwed to the first bolt in a state of surrounding an outer peripheral surface of the pipe to hold the pipe; and a nut holding member configured to be attachably and detachably attached to the restraint member directly or indirectly such that the first nut is disposed at an attached position in a state of holding the first nut.

According to this configuration, as the first bolt and the first nut are fastened to fix the restraint member to the base metal fitting, the pipe is able to directly hold by surrounding the outer peripheral surface of the pipe with the restraint member. For example, it is not necessary to interpose a member having a flange portion between the pipes by welding, and the construction is able to be performed only by the bolt operation, so that the work efficiency is good. In addition, the nut holding member is attachably and detachably provided separately from the restraint member, and the first nut is held at the attached position thereof by the nut holding member, so that it is not necessary for the operator to press the first nut by hand during the tightening of the first bolt and the first nut. That is, the operator is able to perform the fastening work by operating only the first bolt, and is able to improve the work efficiency from this point as well.

Hereinafter, suitable aspects of the present invention will be described. However, the scope of the present invention is not limited by the suitable examples of the aspects described below.

As one aspect, it is preferable that the nut holding member has a first holding insertion hole that holds the first nut in an insertion state, and the first holding insertion hole has a shape capable of preventing the first nut from rotating.

According to this configuration, since the first holding insertion hole has a shape capable of preventing the first nut from rotating, for example, when the first bolt and the first nut are fastened with a light force by hand, the first nut is able to be prevented from slipping, and the fastening work is able to be efficiently performed.

As one aspect, it is preferable that the first holding insertion hole is formed by cutting out a part in a circumferential direction.

According to this configuration, for example, when the first bolt and the first nut are fastened with a large force by using a tool, the rotation of the first nut is able to be allowed and the base metal fitting is able to be firmly fixed to the restraint member.

As one aspect, it is preferable that the restraint member includes a holding portion configured to surround the outer peripheral surface to hold the pipe, base fixing portions configured to extend from the holding portion to face each other and be fixed to the base metal fitting by fastening the first bolt and the first nut, and tightening action portions configured to extend from the holding portion to face each other and apply a tightening force to the holding portion by fastening a second bolt different from the first bolt and a second nut screwed to the second bolt, and the nut holding member is attachably and detachably attached to the base fixing portions or the tightening action portions directly or indirectly such that the first nut and the second nut are disposed at respective attached positions in a state of holding the second nut in addition to the first nut.

According to this configuration, since the tightening action portion is provided separately from the base fixing portion that is fixed to the base metal fitting, in addition to the normal holding of the pipe by the holding portion accompanying the fastening of the first bolt, an additional tightening force is able to be applied to the holding portion by the fastening of the second bolt. As a result, it is possible to increase the surface pressure due to an inner surface of the holding portion and appropriately support the pipe. In this case, since the first nut and the second nut are held at respective attached positions by the nut holding member, the operator does not need to press the first nut and second nut by hand during the fastening of the first bolt and the first nut, and the second bolt and the second nut. That is, the operator is able to perform the fastening work by operating only the first bolt and the second bolt, and is able to improve the work efficiency.

As one aspect, it is preferable that the nut holding member has a second holding insertion hole that holds the second nut in an insertion state, and the second holding insertion hole has a shape capable of preventing the second nut from rotating.

According to this configuration, since the second holding insertion hole has a shape capable of preventing the second nut from rotating, for example, when the second bolt and the second nut are fastened with a light force by hand, the second nut is able to be prevented from slipping, and the fastening work is able to be efficiently performed.

As one aspect, it is preferable that the second holding insertion hole is formed by cutting out a part in a circumferential direction.

According to this configuration, for example, when the second bolt and the second nut are fastened with a large force by using a tool, the rotation of the second nut is able to be allowed and a large tightening force is able to be applied to the holding portion to increase the surface pressure by the inner surface of the holding portion, and the pipe is able to be appropriately supported.

As one aspect, it is preferable that the nut holding member has a holding main body portion in which the second holding insertion hole is formed, and holding engagement portions that are provided in the holding main body portion and engaged with the base fixing portions or the tightening action portions from a side opposite to the holding main body portion.

According to this configuration, the holding engagement portion is engaged with the base fixing portion or the tightening action portion from the side opposite to the holding main body portion, so that the holding main body portion is able to be prevented from being deformed by bending even during the fastening of the first bolt and the second bolt. Therefore, since it is possible to avoid the first nut and the second nut held by the holding main body portion from tilting, the fastening operation of the first bolt and the second bolt is able to be smoothly performed, and thus the work efficiency is able to be improved from this point as well.

As one aspect, it is preferable that the holding portion, the base fixing portions, and the tightening action portions are integrally formed, and a notch portion for preventing the tightening force by the fastening of the second bolt from being transmitted to a base fixing portion side is provided between the base fixing portions and the tightening action portions, and the nut holding member is attached to the base fixing portions directly or indirectly at a position of the notch portion.

According to this configuration, for example, the restraint member is able to be easily formed by punching and bending one metal plate. In addition, by the notch portion provided between the base fixing portion and the tightening action portion, the tightening force due to the fastening of the second bolt is appropriately directed to the holding portion side. Therefore, the pipe is able to be firmly supported. In addition, the first nut and the second nut are able to be stably held at positions close to a center of gravity by using the notch portion located between the base fixing portion that is the attached position of the first nut and the tightening action portion that is the attached position of the second nut.

As one aspect, it is preferable that the pipe support member further includes a fixing auxiliary member configured to temporarily fix the restraint member with respect to the base metal fitting before the fastening by the first bolt, in which the nut holding member is attached to the restraint member via the fixing auxiliary member.

According to this configuration, the operator is able to perform the fastening operation with the first bolt in a state in which both hands are free in a state in which the restraint member is temporarily fixed with respect to the base metal fitting by the fixing auxiliary member and the first nut is held at the attached position by the nut holding member. Therefore, the work efficiency is able to be further improved. In this case, by adopting a structure in which the nut holding member and the restraint member are attached to each other indirectly via the fixing auxiliary member, various attachment structures of the nut holding member are able to be adopted with high degrees of freedom while the configuration of the restraint member is maintained.

Further features and advantages of the present invention will be apparent from the following exemplary and non-limited description of embodiments with reference to the accompanying drawings.

DESCRIPTION OF THE INVENTION

Figure 1:
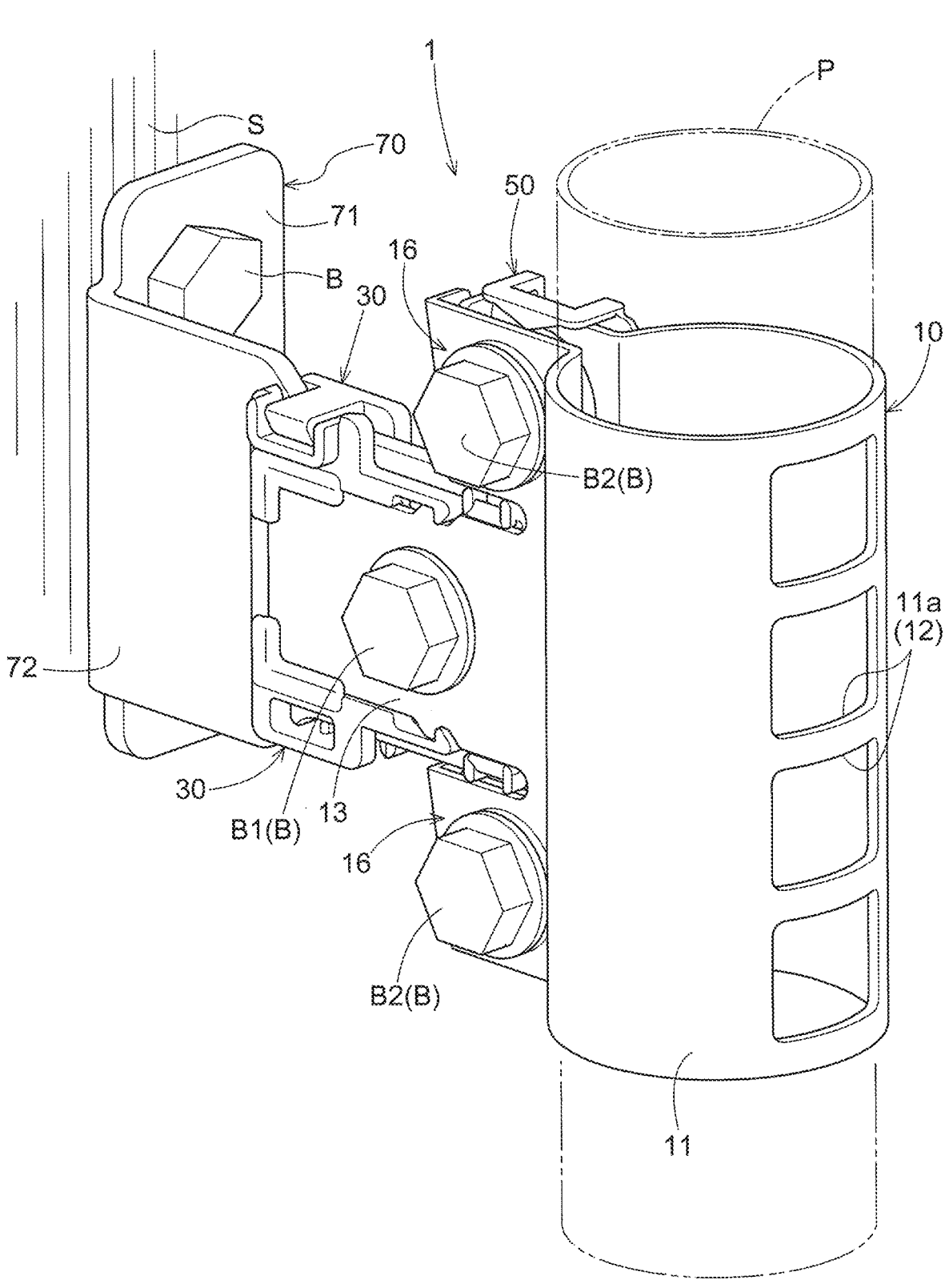
FIG. 1 is a perspective view of a pipe fixing structure using a pipe support member.
Figure 2:
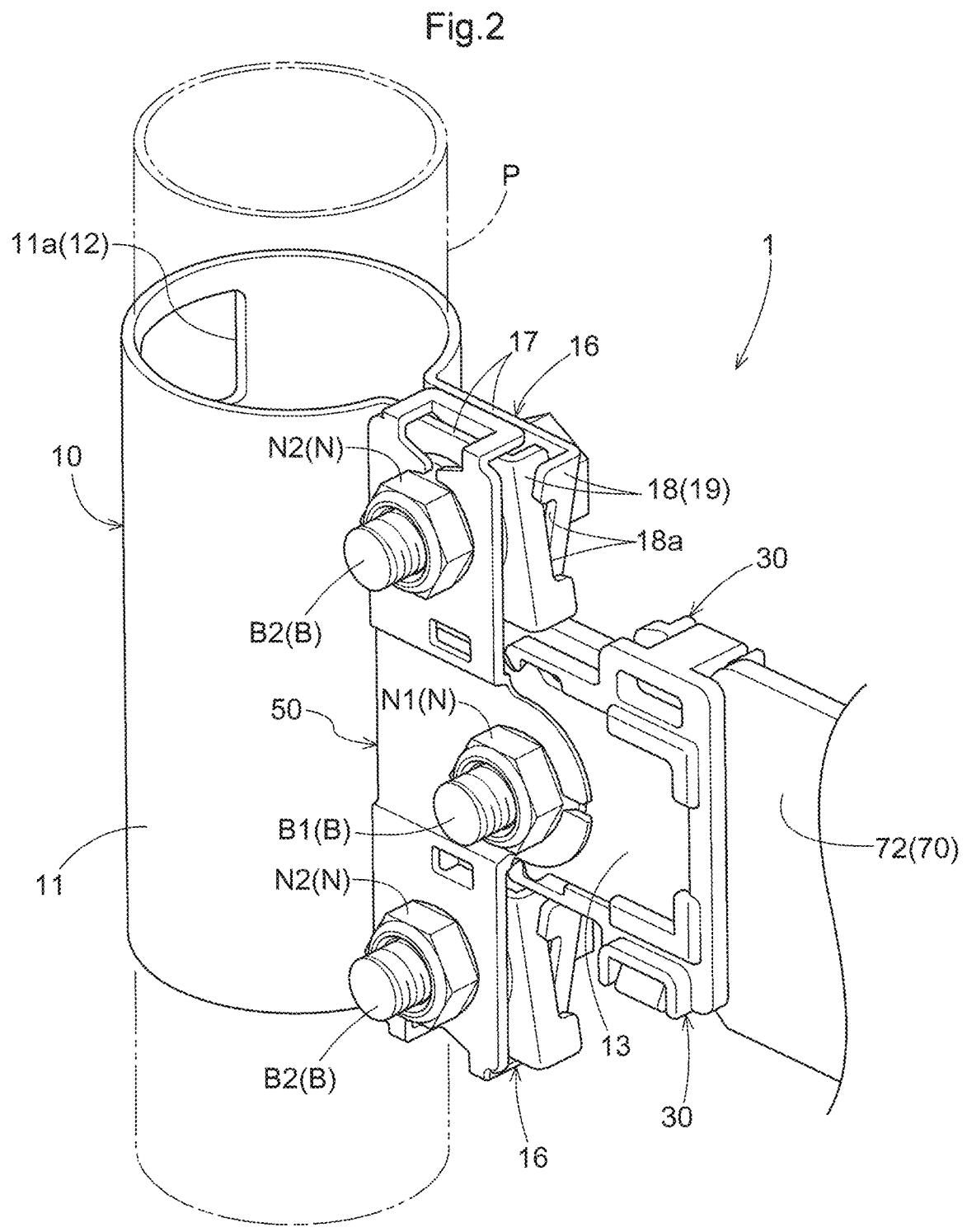
FIG. 2 is a perspective view of the pipe fixing structure using a pipe support member.

An embodiment of the pipe support member will be described with reference to the accompanying drawings. As illustrated in FIGS. 1 and 2, a pipe support member 1 according to the present embodiment is used for supporting a pipe P by being connected to a base metal fitting 70 fixed to a structure S. FIG. 2 is a perspective view of the opposite side of FIG. 1.

In the following description, although terms "axial direction", "circumferential direction", and "radial direction" may be used to represent a shape, a positional relationship, and the like of the respective members, these terms are defined with reference to the pipe P which is a support target supported by the pipe support member 1. That is, the "axial direction" represents an axial core direction (longitudinal direction) of the pipe P, the "circumferential direction" represents a direction that surrounds a periphery of the pipe P, and the "radial direction" represents a direction that radially extends from an axial core of the pipe P. Unless otherwise specified, the reference to each of these directions in the description of each part of the pipe support member 1 is intended to refer to a direction in a state in which the pipe P is actually held.

The pipe support member 1 according to the present embodiment is used, for example, for the pipe P that is disposed over from an outdoor unit of an air conditioner installed on a roof of a structure such as a building to a plurality of indoor units installed indoors. An example of the pipe P is a copper refrigerant pipe.

FIGS. 1 and 2 illustrate an example of a pipe fixing structure in which a predetermined portion of the pipe P disposed in a vertical direction (up-down direction) is fixed to a structure S by using the pipe support member 1 according to the present embodiment. This pipe fixing structure is used to suppress the pipe P from moving relative to the structure S in the axial direction at the fixing location. The structure S is, for example, a frame, an outer wall, or the like of the structure.

Figure 3:
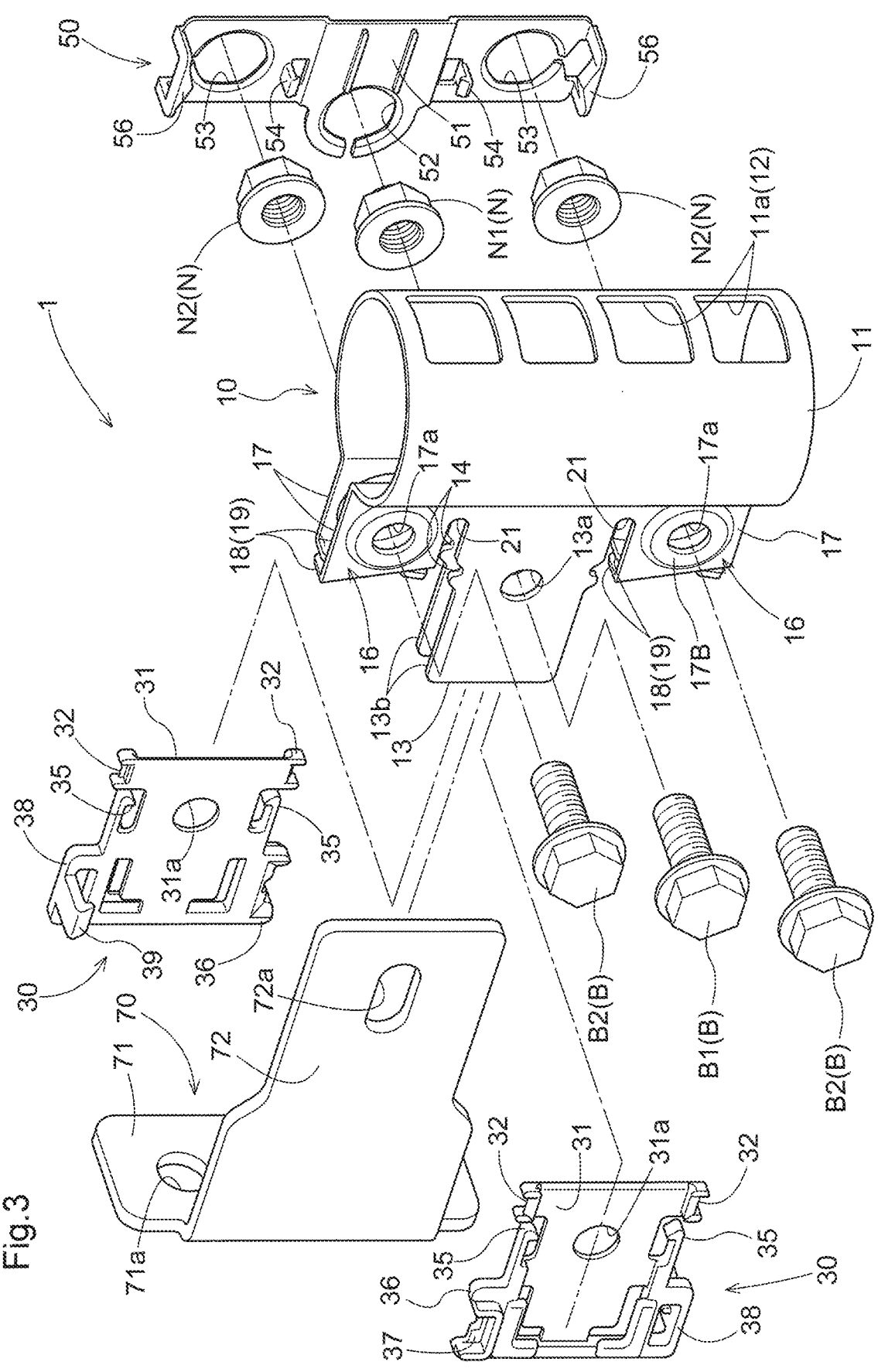
FIG. 3 is an exploded perspective view of the pipe support member.

The base metal fitting 70 is fixed to the structure S. The base metal fitting 70 may be directly fixed to the structure S, or may be indirectly fixed thereto via another member (for example, an interposing member such as a bracket). The base metal fitting 70 is made of metal and is configured using, for example, a hot-rolled soft steel plate or the like. As illustrated in FIGS. 1 and 3, the base metal fitting 70 is formed in a bent plate shape. The base metal fitting 70 includes an attachment base portion 71 that is able to be fitted into a surface contact state with the structure S (or the interposing member), and a connecting portion 72 that is provided to extend in a state of intersecting (in the present example, orthogonal to) the attachment base portion 71. Insertion holes 71a and 72a into which bolts B are inserted are formed in the attachment base portion 71 and the connecting portion 72, respectively.

The pipe support member 1 is connected to the base metal fitting 70 to support the pipe P. The pipe support member 1 supports the pipe P that is disposed along the up-down direction at one portion in the axial direction (up-down direction). As illustrated in FIGS. 1 to 3, the pipe support member 1 of the present embodiment includes a restraint member 10, a fixing auxiliary member 30, and a nut holding member 50. In the present embodiment, the pipe support member 1 includes one restraint member 10, two fixing auxiliary members 30, and one nut holding member 50. The fixing auxiliary member 30 is attachably and detachably attached to the restraint member 10. The nut holding member 50 is attachably and detachably attached to the fixing auxiliary member 30, and is attachably and detachably attached to the restraint member 10 via the fixing auxiliary member 30.

The restraint member 10 is fixed to the base metal fitting 70 in a state of surrounding an outer peripheral surface of the pipe P to hold the pipe P. The restraint member 10 includes a holding portion 11, a base fixing portion 13, and a tightening action portion 16. These are integrally formed. The restraint member 10 is made of metal and is configured using, for example, a hot-rolled soft steel plate or the like.

Figure 8:
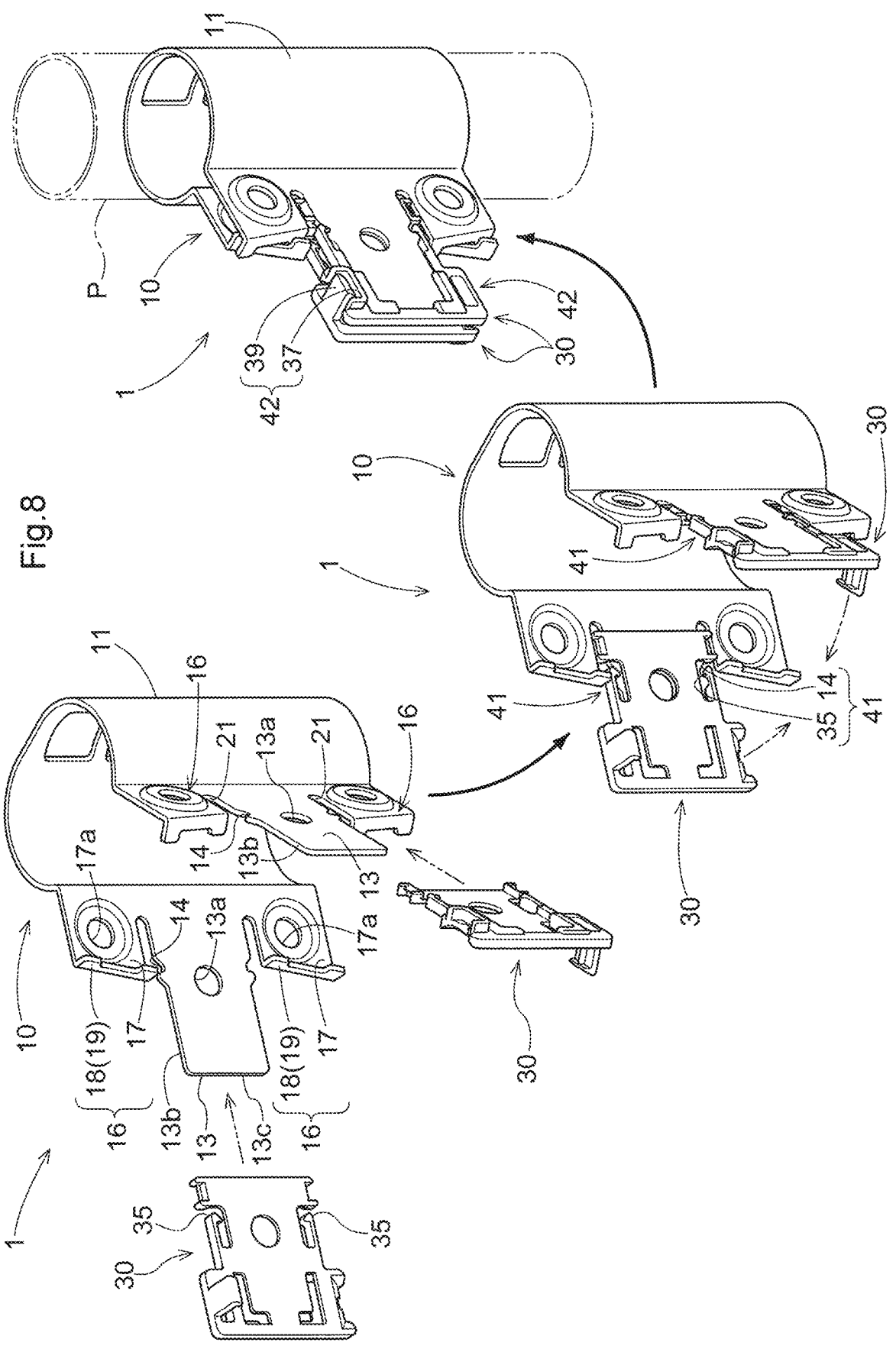
FIG. 8 is a perspective view illustrating a method of using the pipe support member.

The holding portion 11 is a portion for holding the pipe P. The holding portion 11 is formed in a substantially cylindrical shape that is not completely closed. An inner diameter of the holding portion 11 is set to be equal to or substantially equal to an outer diameter of the pipe P. As illustrated in FIG. 8, in a state before use, the holding portion 11 is not formed in a shape that extends along a true circle as viewed in the axial direction, and is somewhat expanded (opening posture). The holding portion 11 is able to be attached to the pipe P from an expanded opening from the outer side in the radial direction. Thereafter, the holding portion 11 is deformed into a closed posture by applying an external force to close the expanded holding portion 11, and a first bolt B1 and a first nut N1, and a second bolt B2 and a second nut N2 are further tightened as described below, whereby the holding portion 11 surrounds the outer peripheral surface of the pipe P to hold the pipe P.

As illustrated in FIGS. 1 to 3, a through-hole 11a is formed in the holding portion 11. The through-hole 11a is formed in a portion of the holding portion 11 on a side opposite to the base fixing portion 13 and the tightening action portion 16. In the present embodiment, a plurality of through-holes 11a is formed along the axial direction (is arranged up and down). The through-hole 11a functions as a bending strength adjusting portion 12 for adjusting the magnitude of the bending strength of the restraint member 10 (specifically, the holding portion 11 constituting the restraint member 10).

The base fixing portion 13 is a portion to be fixed to the base metal fitting 70. The base fixing portion 13 is configured of a pair of plate portions that extends from the holding portion 11 to face each other. In the present embodiment, each of the pair of plate portions constituting the base fixing portion 13 extends in the radial direction from both end portions of the holding portion 11 having a substantially cylindrical shape that is not completely closed in the circumferential direction. The base fixing portion 13 is formed in an elongated rectangular shape. An insertion hole 13a into which the bolt B (specifically, the first bolt B1) is inserted is formed in the base fixing portion 13. The base fixing portion 13 is fixed to the base metal fitting 70 by fastening the first bolt B1. A shaft portion of the first bolt B1 is inserted into two insertion holes 13a of the base fixing portion 13 and the insertion hole 72a of the base metal fitting 70, and is screwed into a nut N (specifically, the first nut N1) on the opposite side to be fastened, whereby the base fixing portion 13 is fixed to the base metal fitting 70.

In addition, on upper and lower side edges 13b of the pair of plate portions constituting the base fixing portion 13, locking recess portions 14 recessed toward a center line side of the base fixing portion 13 are formed, respectively. A locking claw portion 35 of the fixing auxiliary member 30 is locked in the locking recess portion 14.

The tightening action portion 16 is a portion for applying a tightening force to the holding portion 11. The tightening action portion 16 is configured of a pair of plate portions that extends from the holding portion 11 to face each other. In the present embodiment, each of the pair of plate portions constituting the tightening action portion 16 extends in the radial direction from both end portions of the holding portion 11 having a substantially cylindrical shape that is not completely closed in the circumferential direction. An extending length of the tightening action portion 16 from the holding portion 11 is shorter than an extending length of the base fixing portion 13. In the present embodiment, two tightening action portions 16 are provided to be separated up and down with the base fixing portion 13 interposed therebetween.

The tightening action portion 16 includes a tightening main body portion 17 and a distal end bending portion 18.

The tightening main body portion 17 is a main part of the tightening action portion 16. In the present embodiment, the tightening main body portion 17 is formed in a substantially trapezoidal shape. In the present embodiment, two upper and lower tightening main body portions 17 (tightening main body portions 17 located on the front side in FIG. 8) extending from one end of the holding portion 11 in the circumferential direction are formed in a reverse trapezoidal shape in which the upper side is longer than the lower side. On the other hand, the two upper and lower tightening main body portions 17 (tightening main body portions 17 located on the back side in FIG. 8) extending from the other end of the holding portion 11 in the circumferential direction are formed in a true trapezoidal shape in which the lower side is longer than the upper side. As a result, the true trapezoidal-shaped tightening main body portion 17 and the reverse trapezoidal-shaped tightening main body portion 17 are disposed to face each other on the upper side and the lower side, respectively.

A raised portion 17B that rises outward is formed at a center of the tightening main body portion 17. The raised portion 17B is formed in a circular shape. The raised portion 17B functions as a circular rib and improves the strength of the tightening main body portion 17. The insertion hole 17a into which the bolt B (specifically, the second bolt B2 different from the first bolt B1) is inserted is formed at a center of the raised portion 17B. The tightening main body portion 17 including the raised portion 17B is a portion where the second bolt B2 is fastened in the tightening action portion 16. In the present embodiment, the second bolt B2 is fastened at a position closer to the holding portion 11 than the first bolt B1.

The shaft portion of the second bolt B2 is inserted into the insertion hole 17a of the tightening main body portion 17 and is screwed into the nut N (specifically, the second nut N2) on the opposite side to be fastened, whereby a tightening force is able to be applied to the holding portion 11. As a result, a surface pressure of an inner surface of the holding portion 11 is able to be increased, and the pipe P is able to be appropriately supported. For example, since the welding process such as brazing is not required and the construction is able to be performed only by the tightening operation of the bolts B (first bolt B1 and second bolt B2), the work efficiency is good. The bolt operation is also able to be performed with an electric drill, and in this case, the work efficiency is able to be significantly improved. In addition, since the pipe P is held by the holding portion 11 with the surface pressure, the pipe P is not oxidized or deformed (for example, a recess due to bite is generated), and the reliability is high.

The distal end bending portion 18 is a portion where the distal end portion of the tightening main body portion 17 on the side opposite to the holding portion 11 is bent. The distal end bending portion 18 is bent with respect to the tightening main body portion 17 substantially perpendicularly. The distal end bending portions 18 are bent to face each other from the tightening main body portions 17 facing each other. As illustrated in FIGS. 2 and 8, two distal end bending portions 18 facing each other abut against each other in a state of intersecting with each other. In the present embodiment, the distal end bending portion 18 has a substantially rectangular notch recess portion 18a in a central region in the up-down direction. The distal end bending portions 18 of the pair of opposing tightening action portions 16 intersect and abut against each other in a state in which the respective notch recess portions 18a face each other.

As described above, the distal end bending portions 18 are provided on the opposite side of the holding portion 11 with respect to the fastening position (that is, the position of the insertion hole 17a) by the second bolt B2 in the tightening main body portions 17, and abut against each other during the fastening by the second bolt B2. Due to this abutment, the distal end bending portion 18 applies to maintain a certain distance between the tightening main body portions 17 during the fastening by the second bolt B2. As a result, when the second bolt B2 is fastened, a contact point between the distal end bending portions 18 serves as a fulcrum, and the tightening main body portions 17 facing each other with a certain distance therebetween is able to be more firmly sandwiched and held, and thus a greater tightening force is able to be applied to the holding portion 11. In this manner, the surface pressure by the inner surface of the holding portion 11 is able to be further increased, and the pipe P is able to be firmly supported.

In addition, since the pair of distal end bending portions 18 abut against each other in a state of intersecting with each other, the tightening force due to the fastening of the second bolt B2 is able to be uniformly applied to the pair of tightening action portions 16. As a result, by forming the circular raised portion 17B, the strength of the tightening main body portion 17 itself is increased, and the pipe P is able to be stably supported with almost no deformation or deviation of the tightening action portion 16.

In the present embodiment, the distal end bending portions 18 function as proximity restricting portions 19 that abut against each other during the fastening by the second bolt B2 to maintain a certain distance between the tightening main body portions 17.

In the present embodiment, a notch portion 21 is provided between the base fixing portion 13 and each of the two tightening action portions 16. The notch portion 21 is formed to be continuous from the upper and lower side edges 13b of the base fixing portion 13 and to extend along the radial direction. By providing such a notch portion 21, the base fixing portion 13 and the two tightening action portions 16 are able to be cut off, and the tightening force of the tightening action portion 16 exerted by the fastening of the second bolt B2 is able to be prevented from being transmitted to a base fixing portion 13 side. In other words, the tightening force of the tightening action portion 16 exerted by the fastening of the second bolt B2 is able to be appropriately directed to the holding portion 11 side. Therefore, the pipe P is able to be further firmly supported.

Figure 4:
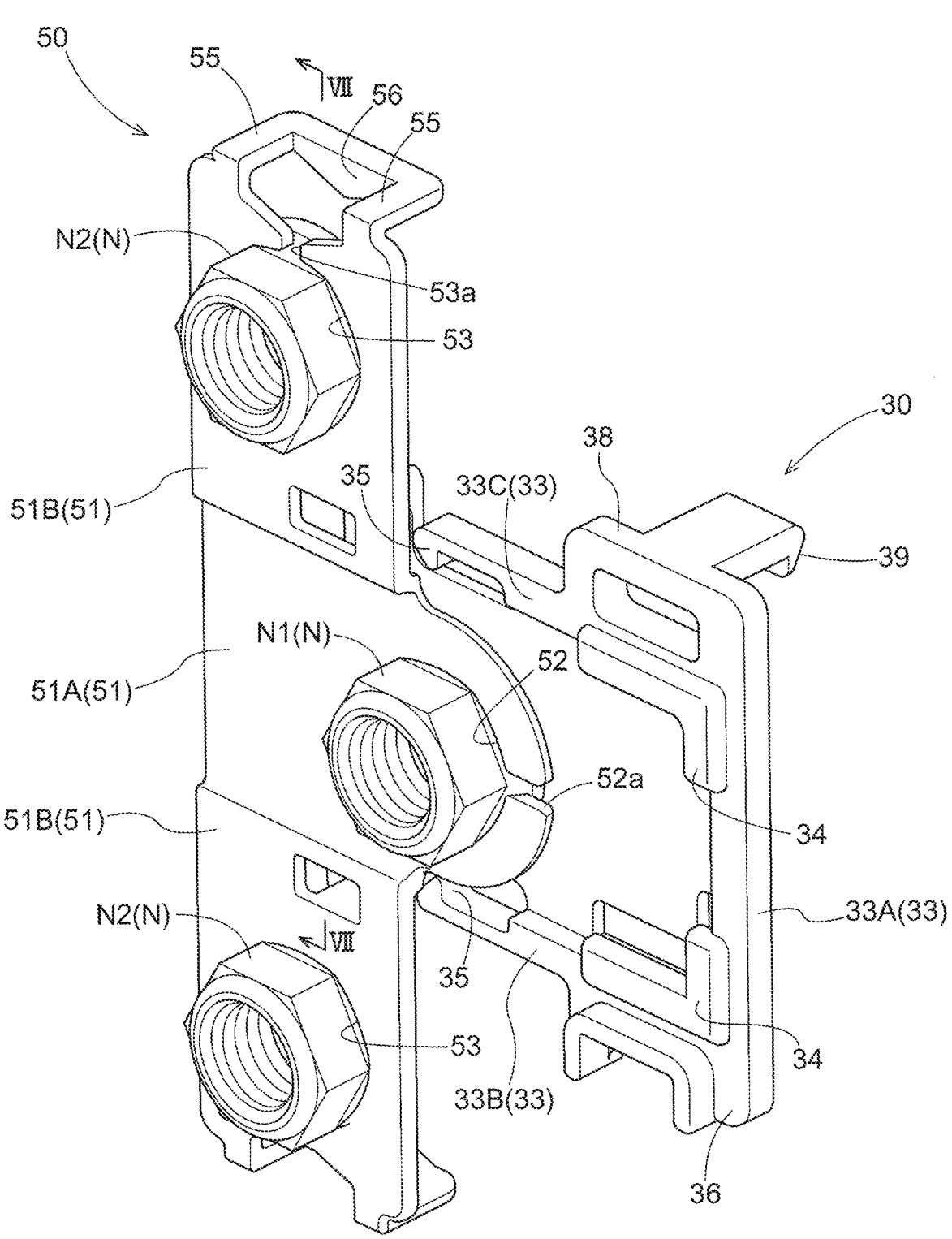
FIG. 4 is a perspective view of a fixing auxiliary member and a nut holding member.

As illustrated in FIGS. 3, 4, and 8, the pipe support member 1 according to the present embodiment includes the fixing auxiliary member 30 attachably and detachably provided to the restraint member 10. The fixing auxiliary member 30 includes a main body portion 31, an attached portion 32, a side wall portion 33, a pressing piece 34, a locking claw portion 35, a first extending portion 36, an engaged portion 37, a second extending portion 38, and an engagement claw portion 39. These are integrally formed. The fixing auxiliary member 30 is made of a resin and is formed of, for example, polypropylene, polyacetal, or the like.

The main body portion 31 is formed in a flat plate shape along the base fixing portion 13 of the restraint member 10. In addition, the main body portion 31 is formed in a rectangular shape. An insertion hole 31a into which the bolt B (specifically, the first bolt B1) is inserted is formed in the main body portion 31. The main body portion 31 is disposed along the inner surface of each of the pair of plate bodies constituting the base fixing portion 13 in a state in which the fixing auxiliary member 30 is mounted on the restraint member 10 (hereinafter, simply referred to as a "mounted state").

The side wall portion 33 is formed to stand up perpendicularly from the main body portion 31 along three sides of the rectangular main body portion 31. The side wall portion 33 includes a first portion 33A, and a second portion 33B and a third portion 33C that extend from both end portions of the first portion 33A, respectively. The first portion 33A abuts against an end edge 13c of the base fixing portion 13 on a side opposite to the holding portion 11 in the mounted state. The second portion 33B and the third portion 33C abut against upper and lower side edges 13b of the base fixing portion 13 in the mounted state.

The pressing pieces 34 are formed at a boundary portion between the first portion 33A and the second portion 33B, and at a boundary portion between the first portion 33A and the third portion 33C of the side wall portion 33. The pressing piece 34 is formed in an L shape at a position separated from the main body portion 31 by a plate thickness of the base fixing portion 13 of the restraint member 10. The pressing piece 34 abuts against an outer surface of each of the pair of plate bodies constituting the base fixing portion 13 in the mounted state. As a result, in the mounted state, the main body portion 31 and the pressing piece 34 cooperate with each other to press the pair of plate bodies constituting the base fixing portion 13 from both the inner and outer sides.

The locking claw portion 35 is formed to extend continuously from the second portion 33B and the third portion 33C of the side wall portion 33. The locking claw portion 35 is locked in the locking recess portion 14 formed on the upper and lower side edges 13b of the pair of plate portions constituting the base fixing portion 13 in the mounted state (see FIG. 8). As a result, it is possible to prevent the fixing auxiliary member 30 mounted on the restraint member 10 from coming off. In the present embodiment, the locking recess portion 14 of the base fixing portion 13 and the locking claw portion 35 of the fixing auxiliary member 30 cooperate with each other to function as a stopper portion 41 that prevents the fixing auxiliary member 30 mounted on the restraint member 10 from being detached.

Figure 6:
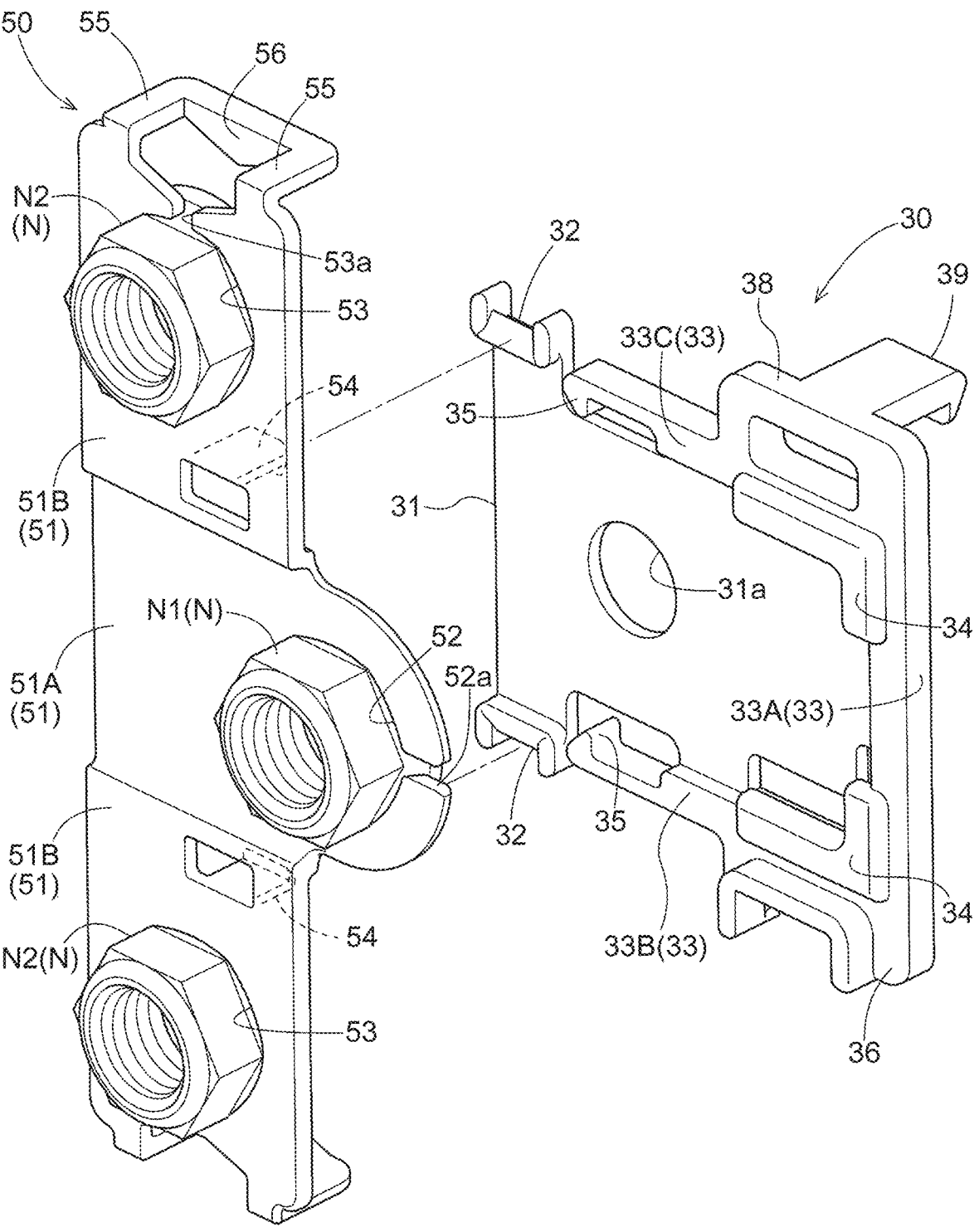
FIG. 6 is an exploded perspective view of the fixing auxiliary member and the nut holding member.
Figure 7:
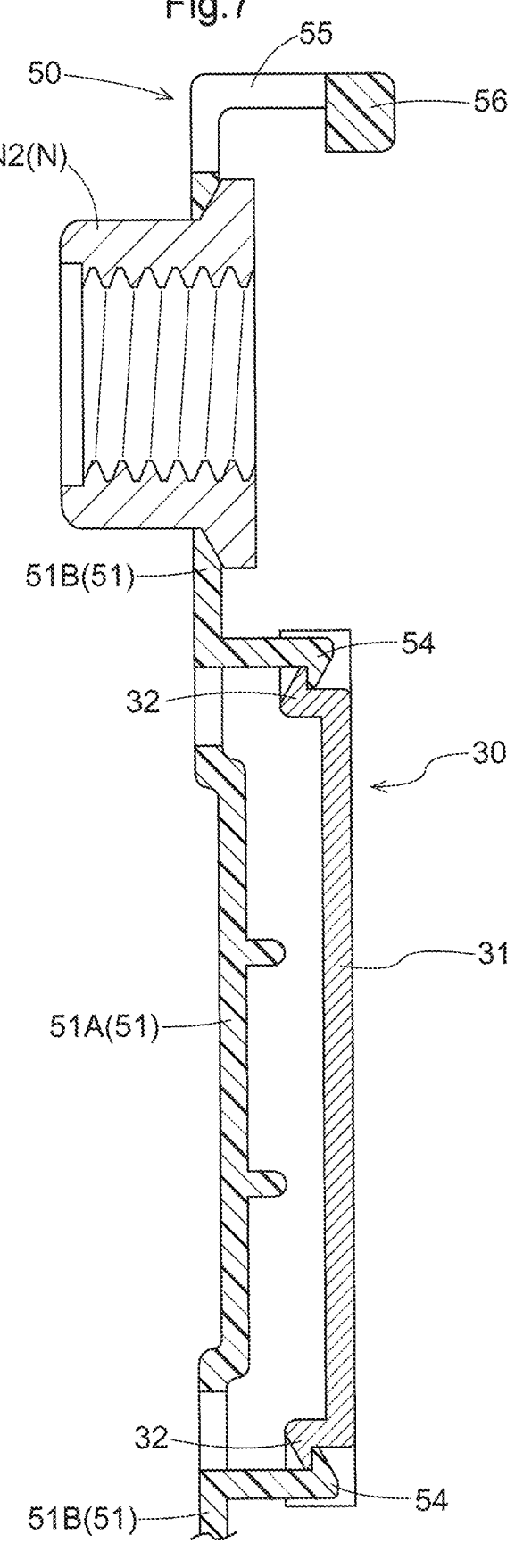
FIG. 7 is a sectional view taken along a line VII-VII in FIG. 4.

The attached portion 32 is formed on a side portion (in other words, an opposite side of the side portion where the first portion 33A is provided) of the main body portion 31 where the side wall portion 33 is not provided. The attached portion 32 is formed in a pair so as to protrude upward and downward from upper and lower end portions of a side portion opposite to the first portion 33A in the main body portion 31. The attached portion 32 is provided adjacent to the locking claw portion 35. The attached portion 32 is disposed in the notch portion 21 in a state in which the fixing auxiliary member 30 is mounted on the restraint member 10. As illustrated in FIGS. 6 and 7, a holding attachment portion 54 provided on the nut holding member 50 is attached to the attached portion 32.

The first extending portion 36 extends outward from the second portion 33B of the side wall portion 33. The second extending portion 38 extends outward from the third portion 33C of the side wall portion 33. An extending direction of the first extending portion 36 and an extending direction of the second extending portion 38 are opposite to each other. The engaged portion 37 is provided at the distal end portion of the first extending portion 36 in a state of intersecting (in the present example, orthogonal) the first extending portion 36. The engagement claw portion 39 is provided at the distal end portion of the second extending portion 38 in a state of intersecting (in the present example, orthogonal) the second extending portion 38. The extending direction of the engaged portion 37 and the extending direction of the engagement claw portion 39 are opposite to each other.

Figure 9:
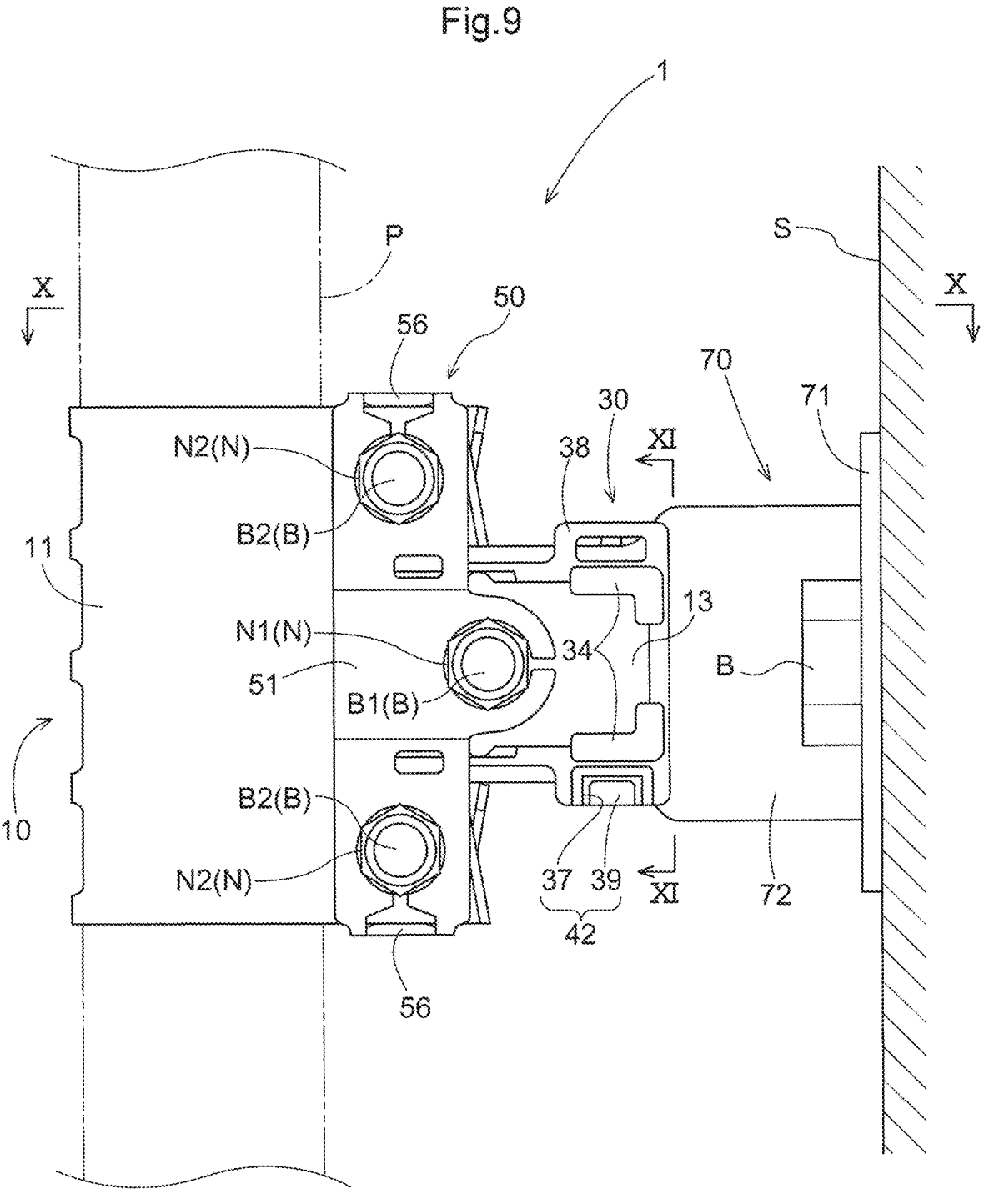
FIG. 9 is a front view of a pipe fixing structure.
Figure 10:
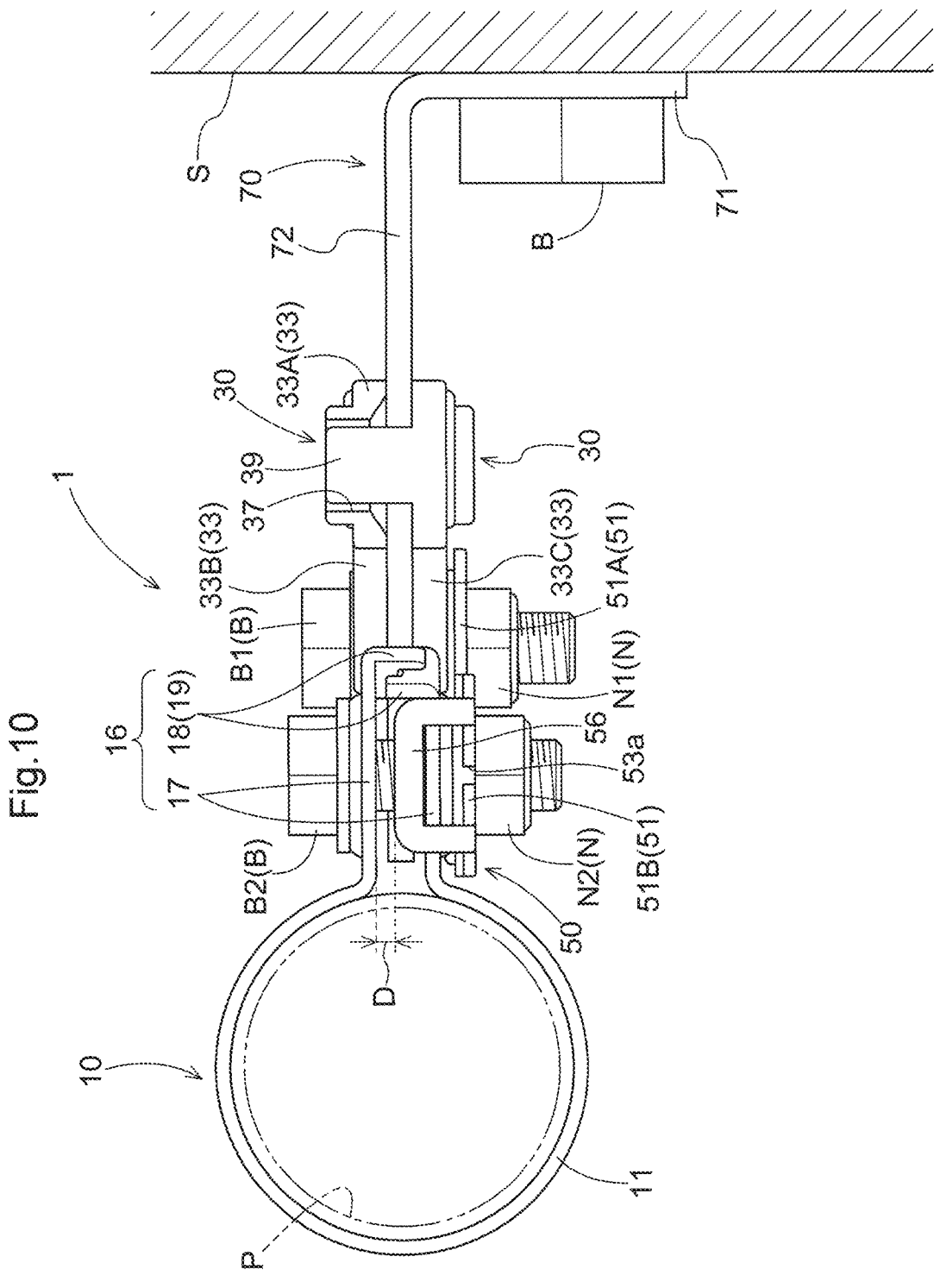
FIG. 10 is a plan view of the pipe fixing structure.
Figure 11:
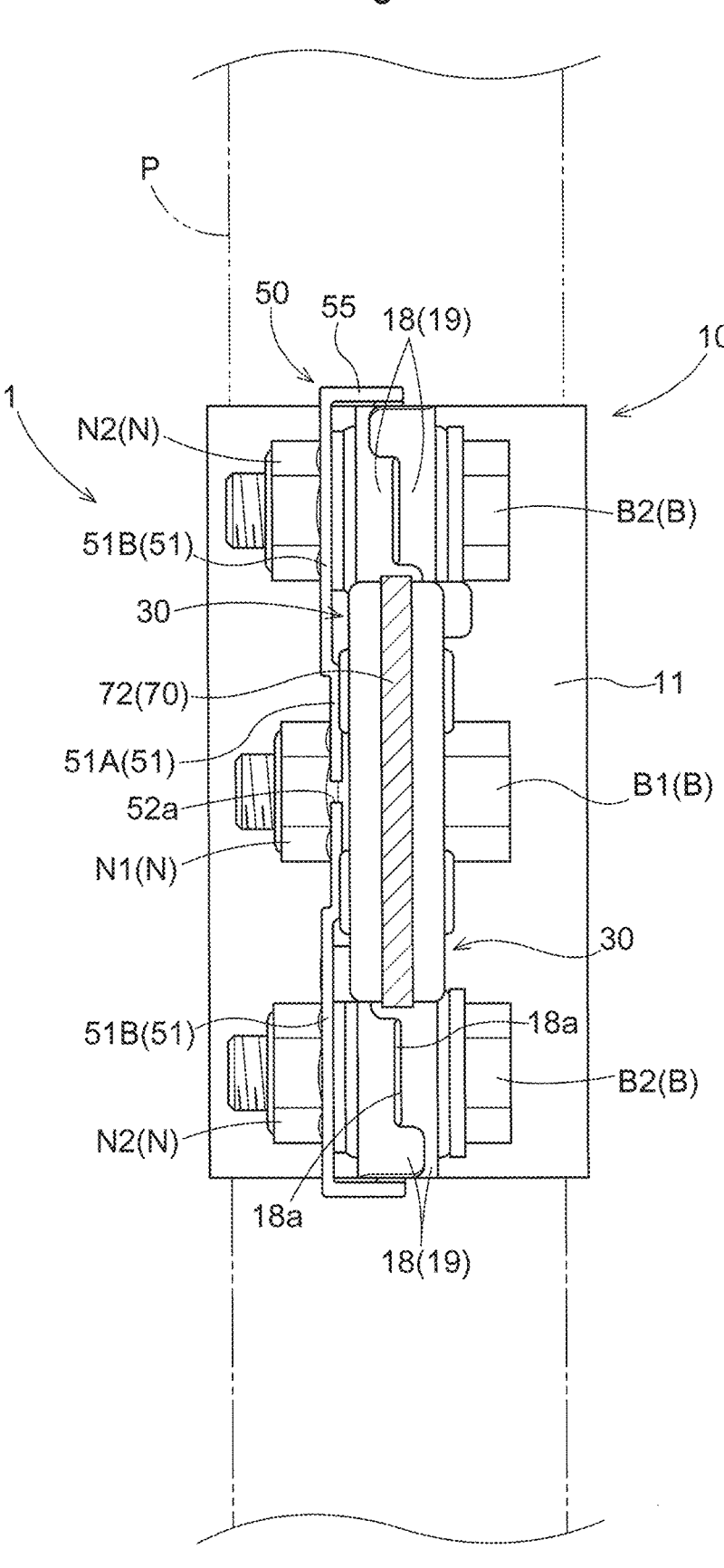
FIG. 11 is a side view of the pipe fixing structure.

In the present embodiment, the fixing auxiliary members 30 having the same shape are mounted on the pair of plate bodies constituting the base fixing portion 13, respectively. Then, when the restraint member 10 is put into the closed posture, as illustrated in FIGS. 8 to 10, the engagement claw portion 39 of one fixing auxiliary member 30 is engaged with the engaged portion 37 of the other fixing auxiliary member 30, and the engagement claw portion 39 of the other fixing auxiliary member 30 is engaged with the engaged portion 37 of one fixing auxiliary member 30. As a result, even if the operator releases the hand, the restraint member 10 is in a state in which the closed posture is held. In the present embodiment, the engaged portion 37 and the engagement claw portion 39, which are provided separately in the two fixing auxiliary members 30, cooperate with each other to function as a closed posture holding portion 42 that holds the closed posture of the restraint member 10.

As described above, first, the fixing auxiliary member 30 is used to temporarily fix the base fixing portion 13 to the base metal fitting 70 before the fastening by the first bolt B1. Therefore, the operator is able to perform the fastening operation with the first bolt B1 in a state in which both hands are free, and the workability is excellent.

In addition, the fixing auxiliary member 30 maintains the mounted state even after the first bolt B1 is fastened, and the main body portion 31 of the fixing auxiliary member 30 is interposed between the connecting portion 72 of the base metal fitting 70 and each of the pair of plate bodies constituting the base fixing portion 13 on both sides thereof. Second, the fixing auxiliary member 30 is used as a spacer for preventing the base metal fitting 70 and the base fixing portion 13 from coming into direct contact with each other. By ensuring a separation width between the pair of plate bodies constituting the base fixing portion 13, and ensuring a separation width between the pair of tightening main body portions 17 of the tightening action portion 16, a tightening allowance for the tightening action portion 16 is ensured by fastening the second bolt B2.

Further, in the present embodiment, since the fixing auxiliary member 30 interposed between the base metal fitting 70 and the base fixing portion 13 is made of a resin having a low thermal conductivity, the heat transfer from the base fixing portion 13 to the base metal fitting 70 is significantly suppressed. Third, the fixing auxiliary member 30 is used as a heat insulating material that suppresses heat transfer from the base fixing portion 13 to the base metal fitting 70. In a case in which the pipe P is a refrigerant pipe as in the present embodiment, heat (for example, cold heat) of the refrigerant circulating in the pipe P is able to be transmitted to the metal restraint member 10 via the pipe P. Even in this case, the fixing auxiliary member 30 is able to function as the heat insulating material, and the cold heat thereof is able to be prevented from being transmitted to the base metal fitting 70. As a result, it is possible to suppress the condensation on the surface of base metal fitting 70.

As illustrated in FIGS. 2 and 3, the nut holding member 50 is attachably and detachably attached to the restraint member 10 such that the first nut N1 and the second nut N2 are disposed at their respective attached positions in a state of holding the first nut N1 and the second nut N2. In the present embodiment, the nut holding member 50 holds one first nut N1 and two second nuts N2. The attached position of the first nut N1 is a position overlapping with the insertion hole 13*a* of the base fixing portion 13, and the attached positions of the second nuts N2 are positions overlapping with the insertion holes 17*a* of the two upper and lower tightening action portions 16 (specifically, the tightening main body portions 17), respectively. In the present embodiment, the nut holding member 50 is attachably and detachably attached to the fixing auxiliary member 30 mounted on the restraint member 10. That is, the nut holding member 50 is indirectly attached to the restraint member 10 via the fixing auxiliary member 30.

As illustrated in FIGS. 2 to 5, the nut holding member 50 includes a holding main body portion 51, the holding attachment portion 54, and a holding engagement portion 56. These are integrally formed. The nut holding member 50 is made of a resin and is formed of, for example, polypropylene, polyacetal, or the like.

The holding main body portion 51 is a main body portion that holds the first nut N1 and the second nut N2. The holding main body portion 51 includes a center plate portion 51A and a pair of extending plate portions 51B extending from the center plate portion 51A to both upper and lower sides. These are integrally formed. In the present embodiment, the extending plate portion 51B is formed by being offset from the center plate portion 51A to be spaced apart from the restraint member 10 in a state of being attached to the restraint member 10. The extending plate portion 51B is formed by being offset from the center plate portion 51A by an amount corresponding to a raised height of the raised portion 17B formed on the tightening main body portion 17 of the tightening action portion 16.

A first holding insertion hole 52 is formed to penetrate the holding main body portion 51. One first holding insertion hole 52 is formed in the center plate portion 51A of the holding main body portion 51. The holding main body portion 51 holds the first nut N1 in a state of being inserted into the first holding insertion hole 52. In the present embodiment, a flange nut is used as the first nut N1, and the holding main body portion 51 holds the first nut N1 in a state in which a nut main body of the first nut N1 is inserted into the first holding insertion hole 52 and a flange portion is locked to a peripheral edge portion of the first holding insertion hole 52. The first holding insertion hole 52 is formed in a substantially hexagonal shape according to an outer shape of the nut main body of the first nut N1. Therefore, the holding main body portion 51 is able to hold the first nut N1 in a state of preventing the rotation thereof.

In the present embodiment, the first holding insertion hole 52 is formed by cutting out a part thereof in the circumferential direction by a slit-shaped notch portion 52*a*. Due to the presence of the slit-shaped notch portion 52*a*, the rotation stop of the first nut N1 by the first holding insertion hole 52 is not complete, and the rotation of the first nut N1 is allowed in a case in which a large force is applied.

In addition, a second holding insertion hole 53 is formed to penetrate the holding main body portion 51. The second holding insertion hole 53 is formed one by one in the pair of extending plate portions 51B of the holding main body portion 51. The holding main body portion 51 holds the second nut N2 in a state of being inserted into the second holding insertion hole 53. In the present embodiment, a flange nut is used as the second nut N2, and the holding main body portion 51 holds the second nut N2 in a state in which a nut main body of the second nut N2 is inserted into the second holding insertion hole 53 and a flange portion is locked to a peripheral edge portion of the second holding insertion hole 53. The second holding insertion hole 53 is formed in a substantially hexagonal shape according to an outer shape of the nut main body of the second nut N2. Therefore, the holding main body portion 51 is able to hold the second nut N2 in a state of preventing the rotation thereof.

In the present embodiment, the second holding insertion hole 53 is formed by cutting out a part thereof in the circumferential direction by a slit-shaped notch portion 53*a*. Due to the presence of the slit-shaped notch portion 53*a*, the rotation stop of the second nut N2 by the second holding insertion hole 53 is not complete, and the rotation of the second nut N2 is allowed in a case in which a large force is applied.

Figure 5:
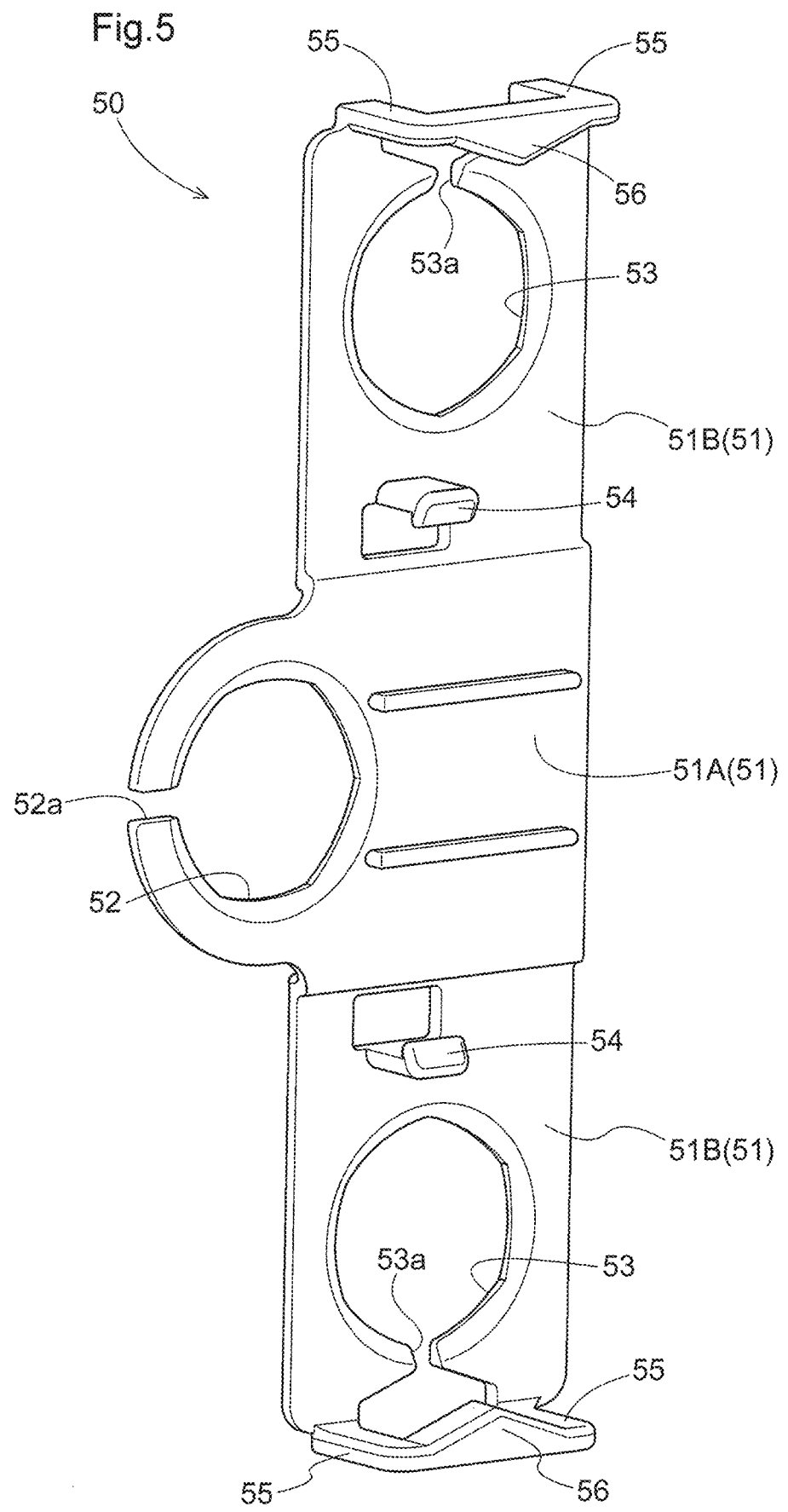
FIG. 5 is a perspective view of the nut holding member.

The holding attachment portion 54 is erected from the holding main body portion 51 (specifically, the extending plate portion 51B). The holding attachment portion 54 is provided at a position between the first holding insertion hole 52 and the second holding insertion hole 53. As illustrated in FIGS. 5 to 7, the holding attachment portion 54 is configured of a pair of claw portions, and is attached to the attached portion 32 provided in the fixing auxiliary member 30. The holding attachment portion 54 is attached to the attached portion 32 at the position of the notch portion 21 provided in the restraint member 10 in a state in which the fixing auxiliary member 30 is mounted on the restraint member 10. As a result, the nut holding member 50 is indirectly attached to the base fixing portion 13 via the fixing auxiliary member 30 at the position of the notch portion 21.

The holding engagement portion 56 is provided at a distal end portion of the holding main body portion 51 (specifically, the extending plate portion 51B). The holding engagement portion 56 is provided over a pair of leg portions 55 that are formed to be bent at the distal end portion of the holding main body portion 51. The holding engagement portion 56 is configured of a triangular engagement piece that extends downward. As illustrated in FIGS. 1, 2, and 10, the holding engagement portion 56 engages with the tightening action portion 16 from a side opposite to the holding main body portion 51 in a state in which the nut holding member 50 is mounted on the restraint member 10 via the fixing auxiliary member 30. As a result, the attachment posture of the nut holding member 50, and thus the holding posture of the first nut N1 and the second nut N2, are stabilized.

In the present embodiment, in a case in which the tightening force of the tightening action portion 16 with respect to the holding portion 11 is insufficient (in a state before the second bolt B2 and the second nut N2 are firmly fastened), as illustrated in FIG. 10, a gap D is present between the holding engagement portion 56 and the tightening main body portion 17 to which the nut holding member 50 is not attached. As the second bolt B2 and the second nut N2 are fastened, the gap D is gradually reduced, and in a case in which the tightening force of the tightening action portion 16 is sufficient, the gap D is eliminated. Therefore, the completion of the tightening is able to be easily visually confirmed from the outside, and the uniformity of the construction is improved.

As described above, in the pipe support member 1 according to the present embodiment, the nut holding member 50 is attachably and detachably attached to the restraint member 10 in a state of holding the first nut N1 and the second nut N2. Since the first nut N1 and the second nut N2 are held at respective attached positions by the nut holding member 50 before the first nut N1 and the second nut N2 are fastened, the operator does not need to hold each of the nuts N1 and N2 by hand during the fastening of the first bolt B1 and the second bolt B2. In addition, since the first nut N1 is rotationally stopped by the first holding insertion hole 52 and the second nut N2 is rotationally stopped by the second holding insertion hole 53, the operator is able to perform the fastening work by operating only the first bolt B1 and the second bolt B2, and the work efficiency is able to be significantly improved.

Further, since the first holding insertion hole 52 and the second holding insertion hole 53 are formed by cutting out a part thereof in the circumferential direction, for example, when the first bolt B1 and the second bolt B2 are fastened with a large force using a tool, the first nut N1 and the second nut N2 is able to be firmly fastened, respectively by allowing the rotation of the first nut N1 and the second nut N2. Therefore, the restraint member 10 is able to be firmly fixed to the base metal fitting 70, and a large tightening force is able to be applied to the holding portion 11 to increase the surface pressure on the inner surface of the holding portion 11, and the pipe P is able to be appropriately supported.

Other Embodiments (1) In the above-described embodiments, a configuration is described as an example in which the nut holding member 50 holds both the first nut N1 and the second nut N2. However, the configuration is not limited to this, and for example, the nut holding member 50 may hold only the first nut N1. In addition, an aspect in which the nut holding member 50 holds only the second nut N2 is also disclosed in the present specification.

(2) In the above-described embodiments, a configuration is described as an example in which the first holding insertion hole 52 and the second holding insertion hole 53 are formed in a substantially hexagonal shape in which a part thereof in the circumferential direction is cut out. However, the configuration is not limited to this, and for example, at least one of the first holding insertion hole 52 or the second holding insertion hole 53 may be formed in a closed substantially hexagonal shape without a notch. In addition, the first holding insertion hole 52 and the second holding insertion hole 53 may be formed in, for example, an oval shape or the like as long as at least the first nut N1 and the second nut N2 are able to be rotationally stopped. Alternatively, the first holding insertion hole 52 and the second holding insertion hole 53 may be formed in a true circle, and it is not always necessary to have the rotation stop function of the first nut N1 and the second nut N2.

(3) In the above-described embodiments, a configuration is described as an example in which the nut holding member 50 is attached to the base fixing portion 13 in the notch portion 21 via the fixing auxiliary member 30. However, the configuration is not limited to this, and the nut holding member 50 may be attached to the tightening action portion 16 in the notch portion 21. In addition, the nut holding member 50 may be attached to the base fixing portion 13 via the fixing auxiliary member 30 outside the notch portion 21.

(4) In the above-described embodiments, a configuration is described as an example in which the nut holding member 50 includes the holding engagement portion 56 that engages with the tightening action portion 16 from the side opposite to the holding main body portion 51. However, the configuration is not limited to this, and the nut holding member 50 may be attached to the restraint member 10 only by the holding attachment portion 54 without including such a holding engagement portion 56.

(5) In the above-described embodiments, a configuration is described as an example in which the pipe support member 1 includes the fixing auxiliary member 30, and the nut holding member 50 is indirectly attached to the restraint member 10 via the fixing auxiliary member 30. However, the configuration is not limited to this, and the pipe support member 1 may not include the fixing auxiliary member 30 (or even in a case in which the pipe support member 1 includes the fixing auxiliary member 30), the nut holding member 50 may be directly attached to the restraint member 10.

(6) In the above-described embodiments, a configuration is described as an example in which the nut holding member 50 is used together with the restraint member 10 that is fixed to the base metal fitting 70 in a state of surrounding the outer peripheral surface of the pipe P in the pipe support member 1 to hold the pipe P. However, the configuration is not limited to this, and the nut holding member 50 is also able to be used together with any member that is fixed by the fastening of the bolt B and the nut N screwed thereinto. Such a nut holding member 50 for such non-limited uses is also disclosed in the present specification. In this case, the nut holding member 50 includes a configuration of the nut holding member 50 that is attachably and detachably attached to a fixed member that is fixed by fastening the bolt B and the nut N that is screwed thereto such that the nut N is disposed at the attached position in a state of holding the nut N.

(7) The configurations disclosed in each of the above-described embodiments (including the above-described embodiments and other embodiments; the same applies hereinafter) are also able to be applied in combination with the configurations disclosed in other embodiments as long as there is no contradiction. Even for other configurations, the embodiments disclosed in the present specification are merely examples in all respects, and the configurations are able to be appropriately modified within a range not departing from the gist of the present disclosure.

DESCRIPTION OF REFERENCE NUMERALS

1: pipe support member
10: restraint member
11: holding portion
13: base fixing portion
16: tightening action portion
21: notch portion
30: fixing auxiliary member
50: nut holding member
52: first holding insertion hole
52a: slit-shaped notch portion
53: second holding insertion hole
53a: slit-shaped notch portion
56: holding engagement portion
70: base metal fitting
B1: first bolt
B2: second bolt
N1: first nut
N2: second nut
P: pipe
S: structure
The invention claimed is:

1. A pipe support member that is connected to a base metal fitting fixed to a structure to support a pipe, comprising:
   a restraint member configured to be fixed to the base metal fitting by fastening a first bolt and a first nut screwed to the first bolt in a state of surrounding an outer peripheral surface of the pipe to hold the pipe; and
a nut holding member configured to be attachably and detachably attached to the restraint member directly or indirectly such that the first nut is disposed at an attached position in a state of holding the first nut, wherein the restraint member comprises a holding portion configured to surround the outer peripheral surface to hold the pipe, base fixing portions configured to extend from the holding portion to face each other and be fixed to the base metal fitting by fastening the first bolt and the first nut, and tightening action portions configured to extend from the holding portion to face each other and apply a tightening force to the holding portion by fastening a second bolt different from the first bolt and a second nut screwed to the second bolt, and wherein the nut holding member is attachably and detachably attached to the base fixing portions or the tightening action portions directly or indirectly such that the first nut and the second nut are disposed at respective attached positions in a state of holding the second nut in addition to the first nut.

2. The pipe support member according to claim 1,
wherein the nut holding member has a first holding insertion hole that holds the first nut in an insertion state, and wherein the first holding insertion hole has a shape capable of preventing the first nut from rotating.

3. The pipe support member according to claim 2,
wherein the first holding insertion hole is formed by cutting out a part in a circumferential direction.

4. The pipe support member according to claim 1,
wherein the nut holding member has a second holding insertion hole that holds the second nut in an insertion state, and wherein the second holding insertion hole has a shape capable of preventing the second nut from rotating.

5. The pipe support member according to claim 4,
wherein the second holding insertion hole is formed by cutting out a part in a circumferential direction.

6. The pipe support member according to claim 4,
wherein the nut holding member has a holding main body portion in which the second holding insertion hole is formed, and holding engagement portions that are provided in the holding main body portion and engaged with the base fixing portions or the tightening action portions from a side opposite to the holding main body portion.

7. The pipe support member according to claim 1,
wherein the holding portion, the base fixing portions, and the tightening action portions are integrally formed, and a notch portion for preventing the tightening force by the fastening of the second bolt from being transmitted to a base fixing portion side is provided between the base fixing portions and the tightening action portions, and wherein the nut holding member is attached to the base fixing portions directly or indirectly at a position of the notch portion.

8. The pipe support member according to claim 1, further comprising:
a fixing auxiliary member configured to temporarily fix the restraint member with respect to the base metal fitting before the fastening by the first bolt, and wherein the nut holding member is attached to the restraint member via the fixing auxiliary member.

9. A pipe support member that is connected to a base metal fitting fixed to a structure to support a pipe, comprising:
a restraint member configured to be fixed to the base metal fitting by fastening a first bolt and a first nut screwed to the first bolt in a state of surrounding an outer peripheral surface of the pipe to hold the pipe;

a nut holding member configured to be attachably and detachably attached to the restraint member directly or indirectly such that the first nut is disposed at an attached position in a state of holding the first nut;

a fixing auxiliary member configured to temporarily fix the restraint member with respect to the base metal fitting before the fastening by the first bolt, and wherein the nut holding member is attached to the restraint member via the fixing auxiliary member.

* * * * *